United States Patent [19]

Ammar

[11] Patent Number: 5,563,460
[45] Date of Patent: Oct. 8, 1996

[54] ELECTRICAL SYNCHRONOUS MACHINE WITH SMOOTH POLES AND WITH A CONSTANT AIR GAP

[75] Inventor: Brahim Ammar, Villecerf, France

[73] Assignee: ABB Industrie, Champagne Sur Seine, France

[21] Appl. No.: 428,286

[22] Filed: Apr. 25, 1995

[30]  Foreign Application Priority Data

Apr. 29, 1994 [FR] France ................... 94 05268

[51] Int. Cl.⁶ ................ H02K 9/00; H02K 1/32
[52] U.S. Cl. .............. 310/59; 310/52; 310/61
[58] Field of Search ............. 310/604, 61, 179, 310/184, 185, 162, 65, 59

[56]  References Cited

U.S. PATENT DOCUMENTS

| | | |
|---|---|---|
| 675,518 | 6/1901 | Merrick et al. . |
| 881,647 | 3/1908 | Alexanderson . |
| 2,708,724 | 5/1955 | Martin et al. ............... 310/261 |
| 2,867,760 | 1/1959 | Huggard et al. . |
| 3,515,916 | 6/1970 | Kovacs . |
| 4,301,386 | 11/1981 | Schweder et al. ........... 310/59 |
| 4,948,996 | 8/1990 | Archibald et al. ........... 310/52 |

FOREIGN PATENT DOCUMENTS

| | | |
|---|---|---|
| 0052383 | 5/1982 | European Pat. Off. . |
| 392904 | 12/1908 | France . |
| 1318289 | 1/1963 | France . |

*Primary Examiner*—Thomas M. Dougherty
*Assistant Examiner*—John C. Butler
*Attorney, Agent, or Firm*—Pennie & Edmonds

[57] ABSTRACT

An electrical synchronous machine of the type with smooth poles and with a constant air gap, comprising a rotor (2) in which the coils are accommodated in notches (4) extending from the periphery of the rotor and which is provided with a device of axial and if need be radial ventilation channels (8) and (9) and wherein the notches (4) over a polar pitch are directed in parallel relation to the axis of the pole and their depth (a) is chosen so as to increase the cross-section of the central zone defined by the bottoms of the notches (4) and comprising axial ventilation channels (8).

12 Claims, 1 Drawing Sheet

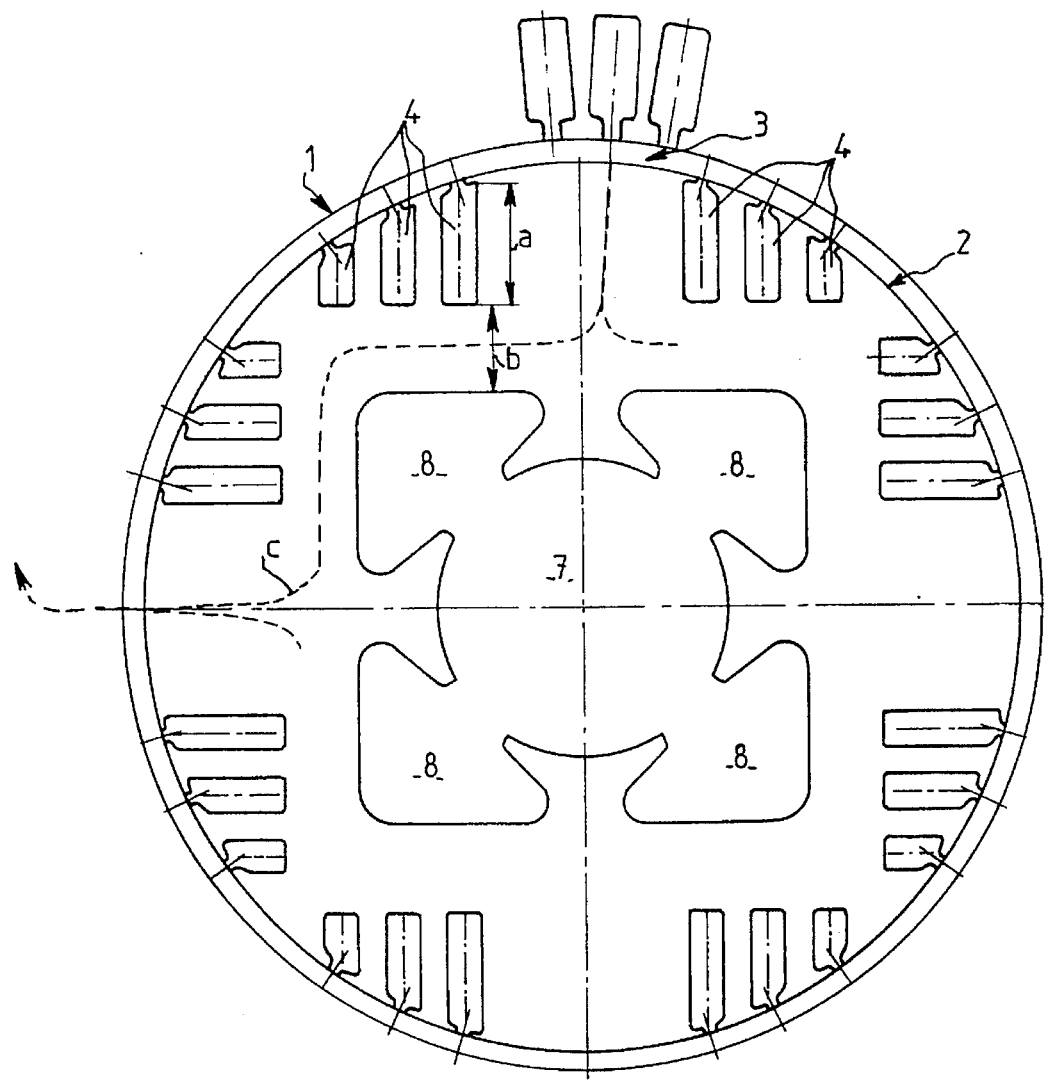
Fig. 1
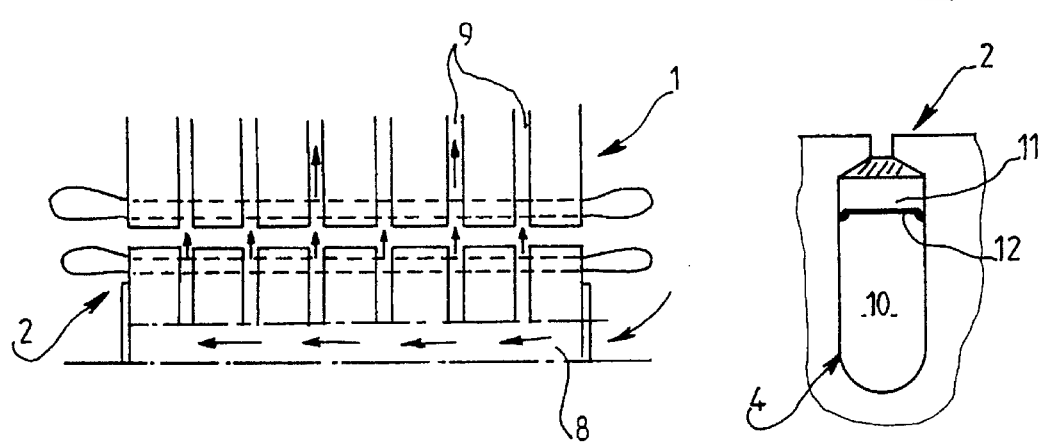
Fig. 2
Fig. 3

ELECTRICAL SYNCHRONOUS MACHINE WITH SMOOTH POLES AND WITH A CONSTANT AIR GAP

FIELD OF THE INVENTION

The invention relates to an electrical synchronous machine of the type with smooth poles and with a constant air gap, comprising a rotor in which the coils or windings are accommodated in notches extending from the periphery of the rotor and which is provided with a device with axial and radial ventilation ducts or channels.

BACKGROUND OF THE INVENTION

In synchronous machines of this kind which are known the notches extend radially in the rotor. This solution exhibits the advantage of permitting the provision of a ventilation device comprising axial and radial ducts or channels. The rotor as well as the stator may be provided with such a device. The cooling air in these ventilation channels is in direct contact with the heat source constituted by the windings or coils of the rotor and stator. But this ventilation device even though it appears to be effective exhibits the major inconveniences of causing substantial head or pressure losses at the inlet of the rotor thereby substantially reducing the air flow rate and of requiring a great number of armature reaction ampere turns thereby resulting in the necessity of increasing the air gap for retaining an acceptable value of the short-circuit coefficient. From the amount of armature reaction ampere turns combined with the air gap increase results a substantial increase of the input excitation power and this in spite of the advantage of the equality of the transverse and longitudinal synchronous reactances.

The object or purpose of the present invention is to provide a synchronous machine which does not exhibit the above-mentioned inconveniences of the known machines and allows to decrease the head or pressure losses at the ingress of the rotor, the amount or number of armature reaction ampere turns and the excitation or energizing power.

To reach this goal, the synchronous machine according to the invention is characterized in that the notches over a polar pitch are directed in parallel relation to the pole axis and their depth is selected so as to increase the cross-section of the central zone defined by the bottoms of the notches and which may comprise ventilation ducts or channels.

According to an advantageous characterizing feature of the invention, the depth of the notches decreases in the direction of moving away from the polar axis.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting example only illustrating a presently preferred specific embodiment of the invention and in which:

FIG. 1 is a view showing the cross-section of the rotor of a synchronous machine according to the present invention;

FIG. 2 is a diagrammatic axial view with parts broken away of a synchronous machine according to the present invention; and FIG. 3 is a view of one notch of the rotor of a synchronous machine according to the present invention.

DETAILED DESCRIPTION OF THE PREFERRED EMBODIMENTS

On FIG. 1 the reference numerals 1 to 3 respectively designate the stator, the rotor and the air gap formed between the stator and the rotor of an electrical synchronous machine of the type with smooth poles and with a constant air gap.

The invention exhibits the main peculiarity that the notches 4 over each polar pitch of the rotor of cylindrical shape are parallel to the axis of the pole. In the embodiment of the invention which is shown by way of example the depth a of the notches 4 decreases in the direction of moving away or increasing distance from the axis of the pole so that the central zone of the rotor 2 which is defined by the bottoms of the notches exhibits a substantially square shape. This central zone comprises a circular central passageway 7 adapted to receive the rotor shaft and between the periphery of this passageway and the line defined by the bottoms of the notches 4, four ventilation ducts or channels 8. These channels exhibit a substantially triangular cross-section and are arranged so that the distance b between the bottoms of the notches 4 and the ventilation ducts 8, i.e. the height of what is called the rotor ring be constant. The value or magnitude of this height depends on the magnetic flux in the machine and of the length of iron. The broken lines in dashes show the lines of magnetic field.

Owing to the particular shape and arrangement of the notches 4 of the rotor 2, the cross-section of the ventilation channels 8 is larger than the channels one may provide in the known rotors with radial notches.

The notches of the rotor according to the invention have a variable section. Therefore the number of wire turns or spirals varies from one notch to another one. This variation of the section could be obtained by a variation of the height or of the width of the notches and by keeping the width and the height, respectively, constant.

The parallel axis arrangement of the notches of the rotor provides an increase of the cooling air passageway section formed by the axial channels 8 at the inlet of the rotor, by from 40% to 70% according to the polarity and with a constant induction in the rotor ring.

The notches of the rotor may be of the semi-closed type with a flat or rounded bottom, of the rectangular type with a flat or rounded bottom or of the trapezoidal type with a flat or rounded bottom. The coils or windings of the rotor are concentric and may consist either of insulated round wire or of insulated flat wire.

As to the device of the ventilation ducts 8, it should be pointed out that the arrangement with parallel axes of the notches 4 of the rotor allows an increase of the cooling air passageway section at the inlet of the rotor by from 40% to 70% according to the polarity and with a constant conduction within the rotor ring. Furthermore it is found with reference to FIG. 2 that the rotor comprises in addition to the axial ventilation channels 8, radial ventilation channels 9 as known per se.

Owing to the particular configuration of the notches of the rotor and of the axial ventilation channels 8 of greater cross-section, the machine according to the invention exhibits smaller head or pressure losses at the intake of the rotor thus resulting in a greater air flow rate and in a lower excitation or energizing power. The latter is caused by a small amount or number of the armature reaction ampere turns, by the equality between the transverse and longitudinal synchronous reactances and by the possibility of reducing the value or size of the air gap.

It should further be noted that the rotor may be a solid body or formed of a stacking of thick or thin metal sheets. In the latter case which is shown in the figures, the ventilation channels 8 and the central passageway 7 are communicating with each other. They are cut out in one single step.

Referring to FIG. 3, there is shown a particular embodiment of the damping cage each notch may be provided with. Indeed above the coil or winding 10 of the rotor is placed a damping winding 11 separated from the rotor coil 10 by an insulating material 12. This damping winding located in the upper portion of the notch could be provided in the shape of a bar.

What is claimed is:

1. Electrical synchronous machine having smooth poles with a constant air gap comprising a rotor having an axis and being provided with peripheral notches having bottoms and sidewalls, and coils accommodated in said notches, said rotor being provided with axial ventilation channels, characterized in that the notches (4) over a polar pitch are parallel to an axis of the pole and their depth (a) decreases in a direction of increasing distance from said polar axis, the bottoms of said notches defining a central zone having a substantially square shape, said rotor comprising four axial ventilation channels (8), each having a substantially right triangular cross-section and spaced equally around the axis of the rotor, and said channels arranged at a predetermined spacing so that the decreasing depth, combined with the generally triangular cross-section of the channels to provide a substantially constant width rotor ring.

2. Machine according to claim 1, characterized in that the cross-section of the notches (4) and the number of spiral turns contained in the notch are variable.

3. Machine according to claim 1, characterized in that one notch comprises above the rotor coils (10) in the upper notch portion a damping winding (11) separated from the rotor coils (10) by an insulating material (12).

4. Electrical synchronous machine according to claim 1 wherein each of said ventilation channels communicates with a central passageway adapted to receive a rotor shaft, perimeters of said ventilation channels collectively defining a substantially square area.

5. Electrical synchronous machine according to claim 1 further comprising radial ventilation channels in said rotor.

6. Electrical synchronous machine comprising a stator and a rotor having smooth poles and a constant air gap between said stator and said rotor, said rotor having an axis and being provided with peripheral notches, said notches having bottoms and sidewalls and rotor coils being accommodated in said notches, said notches associated with each polar pitch being parallel to an axis of the pole, said notches having a depth extending from said gap to an interior of the rotor which depth decreases in a direction of increasing distance from the polar axis so that a central zone defined by the bottoms of the notches has a substantially square shape, said rotor comprising four axial ventilation channels provided in an angularly equidistant manner about the rotor axis, said ventilation channels collectively defining a cross-sectional area shaped such that an outer wall of each of said channels is separated from a line determined by the bottom of the notches by a substantially constant distance for accommodating a magnetic flux in the machine and the length of an iron.

7. Electrical synchronous machine according to claim 6, wherein each of said four axial ventilation channels has a substantially triangular cross-section.

8. Electrical synchronous machine according to claim 6 wherein each of said four ventilation channels communicates with a central passageway adapted to receive a rotor shaft.

9. Electrical synchronous machine according to claim 8, wherein each of said four axial ventilation channels has a substantially triangular cross-section.

10. Electrical synchronous machine according to claim 6, characterized in that the cross-section of the notches (4) and the number of spiral turns contained in the notch are variable.

11. Electrical synchronous machine according to claim 6, characterized in that one notch comprises above said rotor coils (10) in an upper notch portion, a damping winding (11) separated from said rotor coils (10) by an insulating material.

12. Electrical synchronous machine according to claim 6 further comprising radial ventilation channels in said rotor.

* * * * *